July 18, 1967   R. E. REIBER ET AL   3,331,090
LIQUID SUCTION, STORAGE AND DISCHARGE DEVICE
Filed Dec. 1, 1964   4 Sheets-Sheet 1
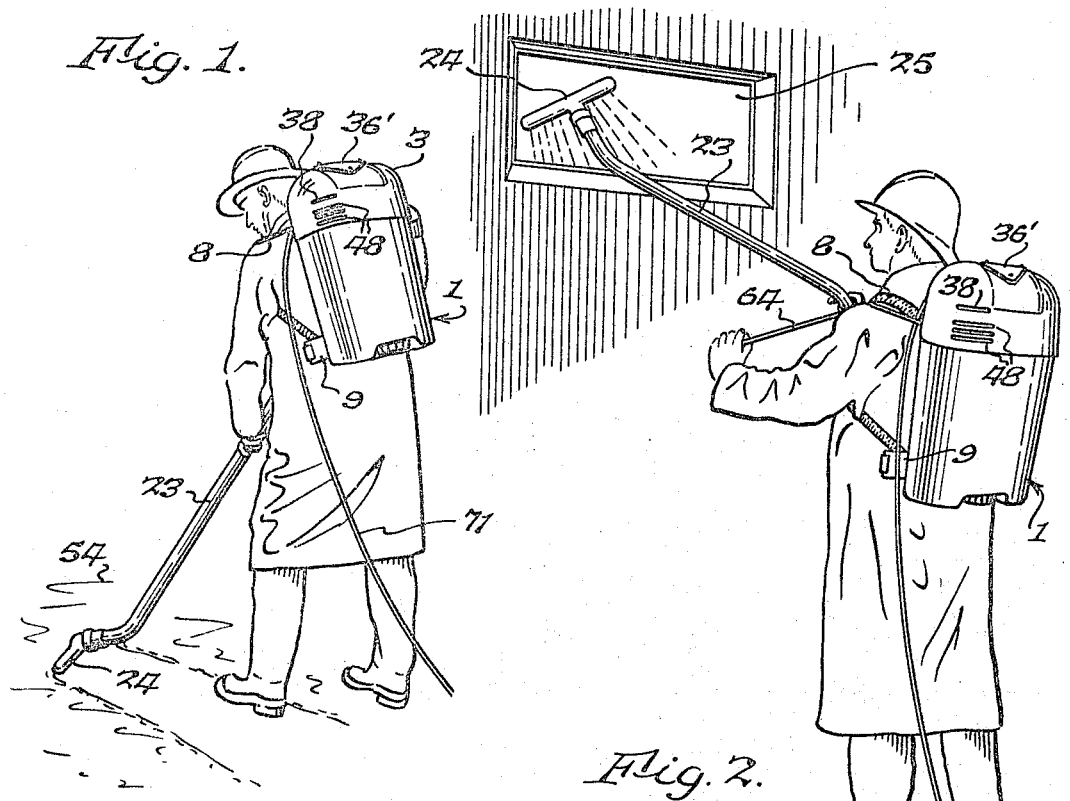
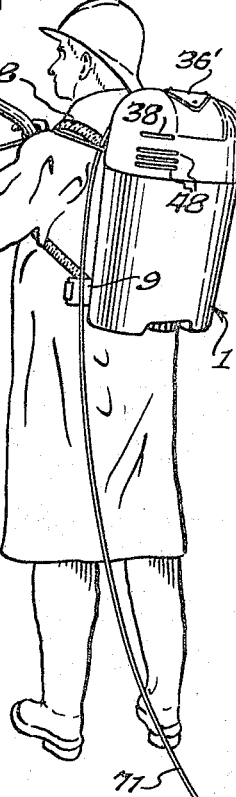
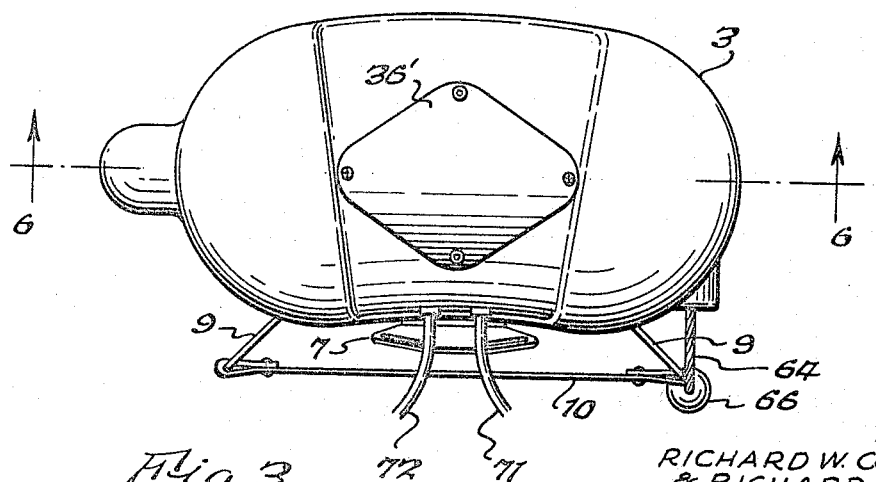
INVENTORS
RICHARD W. COOLBAUGH
& RICHARD E. REIBER
BY
Christel & Bean
ATTORNEYS.

July 18, 1967 R. E. REIBER ET AL 3,331,090

LIQUID SUCTION, STORAGE AND DISCHARGE DEVICE

Filed Dec. 1, 1964 4 Sheets-Sheet 2

INVENTORS
RICHARD W COOLBAUGH
& RICHARD E. REIBER
BY

*Christel & Bean*

ATTORNEYS.

INVENTORS
RICHARD W. COOLBAUGH
& RICHARD E. REIBER
BY
Christel & Bean
ATTORNEYS.

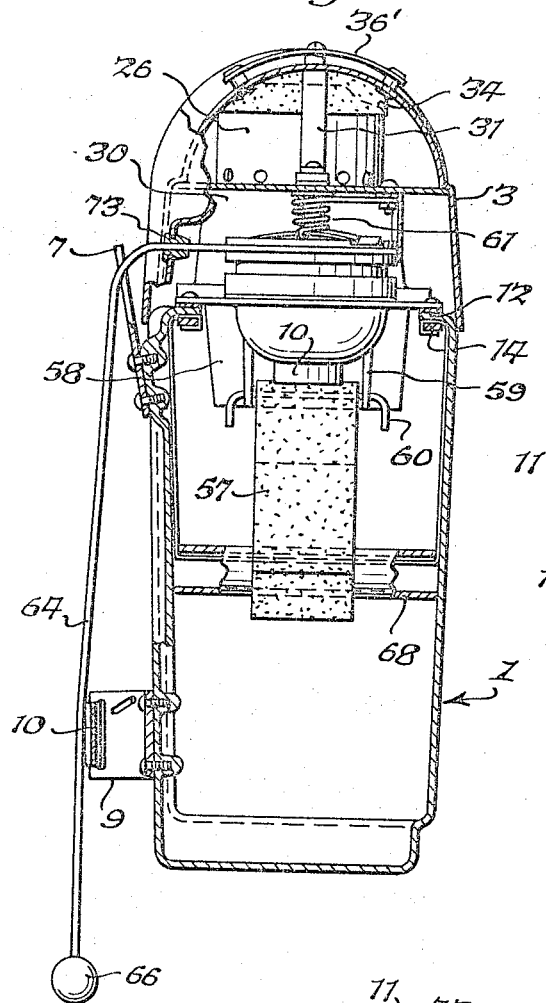

United States Patent Office 3,331,090
Patented July 18, 1967

3,331,090
LIQUID SUCTION, STORAGE AND DISCHARGE
DEVICE
Richard E. Reiber and Richard W. Coolbaugh, East
Aurora, N.Y., assignors, by mesne assignments, to Scott
Aviation Corporation, Lancaster, N.Y., a corporation
of New York
Filed Dec. 1, 1964, Ser. No. 415,101
7 Claims. (Cl. 15—321)

This invention relates to a new and useful pick-up, storage and discharge device for the ready removal of surface liquids.

There has long been a need for an efficient, versatile, power operated device for removing and disposing of surface liquid accumulations. Customarily, resort is had to hand mopping of the wet area, which is tedious, time consuming, unpleasant and relatively inefficient and unsanitary. For deeper accumulations, such as in flooded cellars and the like, sump pumps are available. However, they immediately eject the water as it is picked up and are limited in untility, being unsatisfactory for many situations. Power operated devices are known which will pick up and store liquids, but when the storage tank is full it must be removed to an area where the liquid can be drained from the tank by gravity discharge. This, too, is relatively inefficient and unsatisfactory.

Accordingly, a primary object of this invention is to provide a power operated device which will quickly and efficiently pick up liquid accumulations, store the picked up liquid, and selectively discharge the stored liquid under power.

Another object of this invention is to provide a portable, self-contained, power-actuated liquid pick up, storage and discharge device which is adapted to be carried about by the user.

It is also an object of this invention to provide a power-actuated pick up, storage and discharge device for liquid accumulations of all kinds, whether resulting from spills, floor cleaning, plumbing failure, fires or other causes.

Another object of this invention is to provide a power operated pick up, storage and discharge device for water and other liquids, including normally corrosive liquids such as strongly acid and alkaline chemical solutions.

Still another object of this invention is to provide a liquid pick up, storage and discharge device which can be used to first discharge a cleaning agent or solvent onto the area to be cleaned, then pick up the resulting liquid accumulation and subsequently discharge the same.

In one aspect thereof, a liquid pick up, storage and discharge device constructed in accordance with this invention is characterized by the provision of a tank containing a liquid storage compartment and a motor compartment, a harness for mounting the tank on the back of a person, an elongated tubular conduit including a flexible hose and connected to the tank for delivering liquid to and from the storage compartment, an air pump in the motor compartment, the pump having an inlet and an outlet, means including a valve movable between a first position connecting the pump inlet to the storage compartment for evacuating air therefrom to draw liquid into the storage compartment through the conduit and a second position connecting the pump outlet to the storage compartment for pressurizing the storage compartment to discharge liquid therefrom through the conduit, a return spring biasing the valve into its first position, and a lanyard connected to the valve and extending from the tank for selectively moving the valve to its second position against the urging of its return spring.

The foregoing and other objects, advantages and characterizing features of a liquid pick up storage and discharge device of this invention will become clearly apparent from the ensuing detailed description of an illustrative embodiment thereof, in conjunction with the accompanying drawings depicting the same wherein like reference numerals denote like parts throughout the various views and wherein:

FIG. 1 is a perspective view showing a pick up, storage and discharge device of this invention in use picking up liquid from a floor surface;

FIG. 2 is a corresponding perspective view showing liquid being discharged from the device through a window above the head of the operator;

FIG. 3 is a top plan view of the liquid pick up, storage and discharge device of FIGS. 1 and 2 on an enlarged scale, the electric cords being broken away and the wand and nozzle being omitted for ease of illustration;

FIG. 8 is a vertical sectional view thereof taken about on line 8—8 of FIG. 6;

FIG. 9 is a fragmentary sectional view through the reversing valve, taken about on line 9—9 of FIG. 10, on an enlarged scale;

FIG. 10 is a fragmentary transverse sectional view taken about on line 10—10 of FIG. 6; and FIG. 11 is a fragmentary, detail view, partly in transverse section and partly in plan, showing a portion of the air passages through the mounting plate and the reversing valve.

Figure 4:
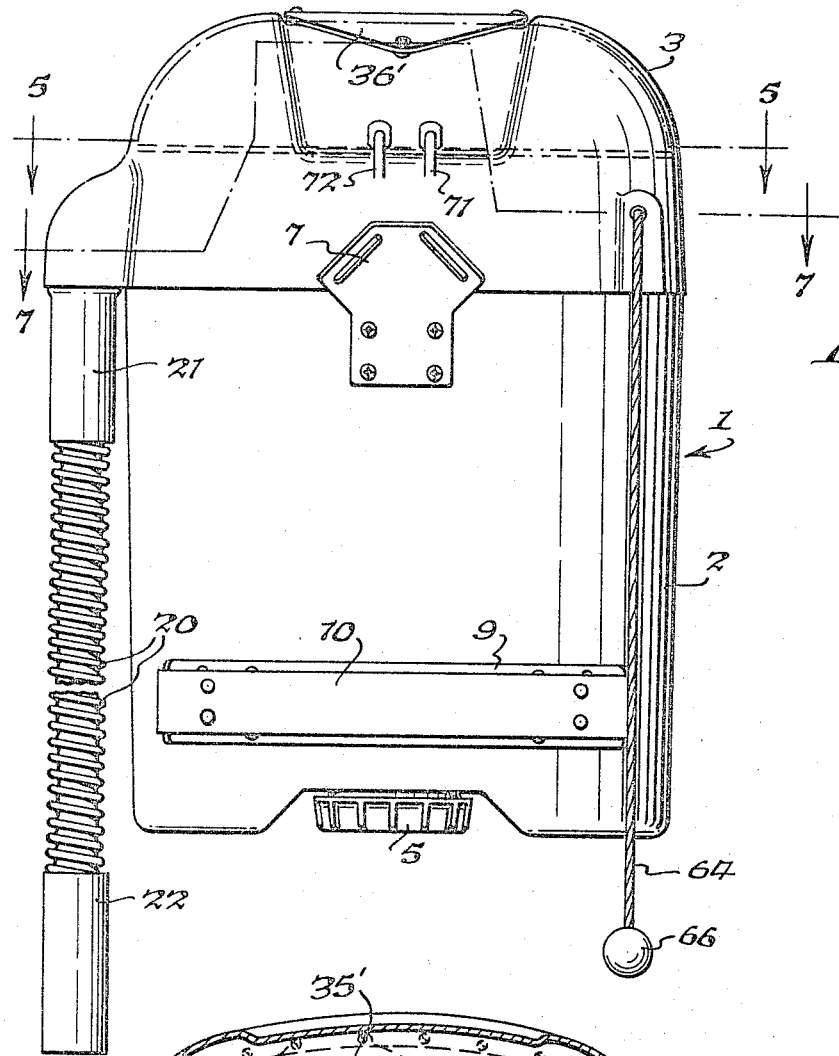
FIG. 4 is a rear elevational view thereof.
Figure 5:
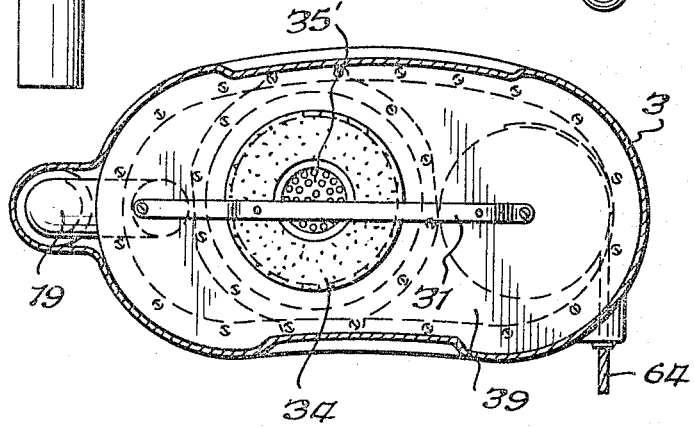
FIG. 5 is a transverse sectional view thereof taken about on line 5—5 of FIG. 4, the lanyard being broken away and the attaching hardness brackets being omitted for ease of illustration.

Referring now in detail to the illustrative embodiment depicted in the accompanying drawings, there is shown a tank, generally designated 1, comprises a body 2 having an open upper end surmounted by a motor housing and cowling 3. Tank body 2 can be constructed of any suitable material, for example a high impact, light weight, high density polyethylene which has the advantage of being dent proof, color permanent, non-corrosive and electrically non-conductive. The motor housing and cowling 3 also can be made of any suitable material, for example high impact, light weight, electrically non-conductive acrylonitrile butadiene styrene.

Tank body 2 provides a storage reservoir of substantial capacity, for example approximately 4¾ gallons, and has a clean-out opening 4 in its bottom wall which is normally closed by a cap 5 with a sealing gasket therebetween.

The rear or back wall 6 of tank 1 is concavely curved, for fitting against the back of the user, and has a harness bracket 7 secured thereto, for receiving a pair of shoulder harnesses, one of which is shown at 8 in FIGS. 1 and 2. The lower ends of the shoulder harnesses 8 are connected to a waist bracket assembly 9 having diverging side portions with a resilient strap 10 stretched thereacross in spaced relation to the tank wall 6, for cushioning the lower part of the tank against the back of the user.

Figure 7:
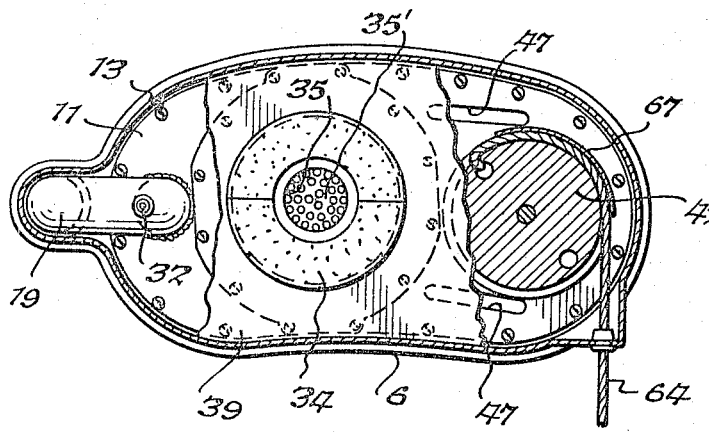
FIG. 7 is another transverse sectional view thereof, taken about on line 7—7 of FIG. 4.

A cast mounting plate 11 extends across the open upper end of tank body 2, having a peripheral flange overlying an inturned flange 12 formed around the upper end of tank body 2, being secured thereto by bolts 13 (FIG. 7) or other suitable fastenings extending through plate 11, flange 12 and a back up plate 14 therebelow. Suitable gasket material is interposed between plate 11 and flange 12, thereby sealing off the upper end of tank body 2, providing a liquid storage compartment 15 within tank body 2 and a separate motor and pump compartment 16 within the motor housing and cowling 3, the compartment 16 being superposed above the storage compartment 15.

Mounting plate 11 is provided adjacent one edge thereof with a depending, tubular extension 17 opening therethrough into storage compartment 15 and receiving the upper end of a standpipe 18 which terminates at its lower end in closely spaced relation to the bottom wall of tank body 2. An inverted, generally U-shaped conduit 19 has one end welded or otherwise secured to mounting plate 11 at the upper end of tubular portion 17, the other end of conduit 19 being spaced exteriorly of the tank side wall. An external tubular conduit comprising an elongated flexible hose 20 is secured at one end to the external end of conduit 19 by a hose clamp 21. At its other end, hose 20 carries a fitting 22 adapted to receive one end of an elongated wand 23. The opposite end of wand 23 is adapted to receive a floor tool or other type of nozzle 24. Wand 23 and nozzle 24 can be made of a suitable, non-corrosive, electrically non-conductive material such as a styrene plastic, while hose 20 is of a highly flexible, non-cracking, non-kinking electrically non-conductive material preferably free of reinforcing wire.

It is a particular feature of this invention that the tubular conduit comprising nozzle 34, wand 23, hose 20 and conduit 19 delivers liquid to the storage compartment 15 when picking up liquid, and also delivers liquid from the storage compartment 15 when discharging liquid from the storage compartment thereby providing a compact and convenient arrangement. It is a further feature of this invention that liquid is discharged from storage compartment 15 through the aforesaid conduit under power, whereby it can be discharged through a window 25 or the like, at an elevation well above the height of the person using the device. This is accomplished in the following manner.

Figure 6:
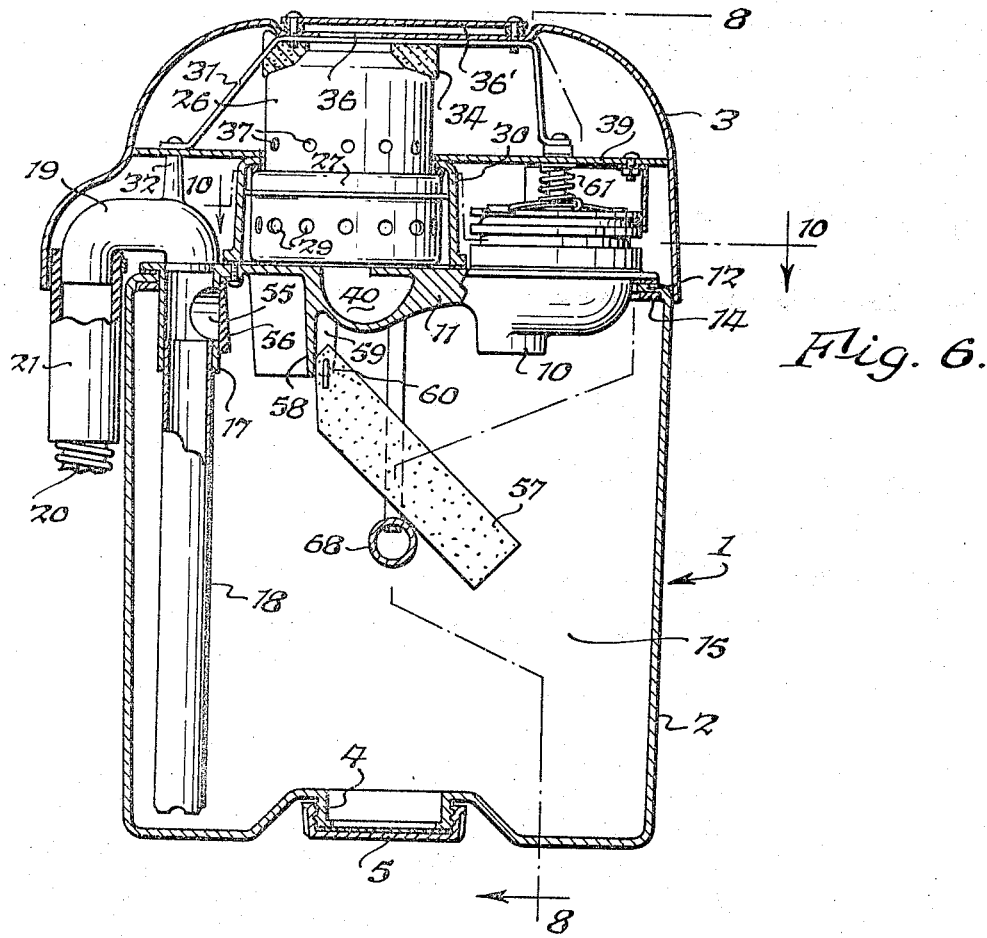
FIG. 6 is a vertical sectional view thereof taken about on line 6—6 of FIG. 3, the flexible hose being broken away for ease of illustration.

An electric motor-air blower or pump unit of known construction is mounted in the motor compartment 16. The blower can be of the centrifugal turbine type used in certain vacuum cleaners, for example, and being conventional and per se no part of this invention the internal details of the motor and turbine are not illustrated. Motor casing 26 has the turbine casing 27 connected to one end thereof, a drive shaft 27' extending therebetween, and is vertically mounted with the turbine casing 27 seated on mounting plate 11, a sealing gasket being provided therebetween. The air pump has a central intake opening 28 (FIG. 10) at its lower end, and peripheral discharge openings as indicated at 29 (FIG. 6) into the space between blower casing 27 and a surrounding housing 30 which is seated on mounting plate 11 and against the upper end of the blower, with appropriate sealing material therebetween, to provide a closed exhaust chamber encircling the blower.

The electric motor-air pump assembly is held down in position on mounting plate 11 by means including a cowling anchor strap 31 secured at one end to a post 32 projecting upwardly from the inverted U-shaped conduit 19, and at its other end to a mounting bolt 33 (FIG. 9) secured to mounting plate 11. A ring of resiliently yieldable, cushioning gasket material 34 encircles the upper end of the motor casing 26, being held thereagainst by strap 31.

Motor casing 26 has an air intake 35 centrally through its upper end, containing a filter screen 35'. Cowling 3 is provided with a motor ventilating air intake 36 and a shielding cover 36' spaced thereover, the cover 36' and the upper end portion of cowling 3 being convexly curved, whereby moisture and debris will be deflected away from the ventilating air opening 36. Motor casing 26 has ventilating air exhaust openings 37 therearound, and cowling 3 is provided with motor air exhausts slot 38. It is a further feature of this invention that the motor ventilating air path is maintained separate and distinct from the air pump inlet and outlet paths to be described in greater detail hereafter, the separation being maintained by a baffle plate 39 horizontally subdividing cowling 3 and mounted on the post 32 and bolt 33 previously described.

Referring now primarily to FIGS. 10 and 11, mounting plate 11 is provided with a first air passage 40 therethrough, opening at one end into the inlet opening 28 of the air pump (see also FIG. 6) and at its other end into an opening 41 positioned beneath a rotary, two position reversing valve 42. Mounting plate 11 is provided with a second air passage 43 which opens at one end into the space between pump casing 27 and housing 30, for communication with the air outlet openings 29 of the pump. Passage 43 opens at its opposite end in an opening 44 also alined with valve 42.

A pair of third air passages 45 extend through mounting mounting plate 11 between a common opening 46 also alined with valve 42 (see FIG. 9), and a pair of openings 47 into the space between mounting plate 11 and baffle plate 39, and between cowling 3 and pump housing 30, for communication with the external atmosphere through cowling slots 48 (FIGS. 1 and 2).

Mounting plate 11 also has a generally vertical air passage 50 therethrough, between the motor and storage compartments, with its upper end opening into valve 44 (FIG. 9) and provided with a tubular stop 51 projecting upwardly therefrom into a first kidney-shaped passage 52 in valve 42. In one position of the valve 42, shown in FIG. 10, valve passage 52 places air passage 50 in communication with passageway 40 leading to the pump air inlet. A second kidney-shaped passageway 53 in valve 42 is arranged, in this position of the valve, to place passageway 43 leading from the pump outlet in communication with passageway 45 leading to openings 47 for exhausting the pump outlet to the atmosphere through slots 48. Therefore, in this, the intake position of valve 42 air is evacuated from storage compartment 15 through passages 50, 52 and 40, the pump, passages 43, 53 and 45, the lower part of cowling 3, and out through slots 48. This produces a section, causing liquid as indicated at 54 (FIG. 1) to be drawn in through nozzle 24, wand 23, hose 20 and conduit 19 into the storage compartment 15.

To facilitate the pick up of liquid with maximum efficiency, a lateral opening 55 is provided in tubular extension 17 at the upper end of standpipe 18. Opening 55 normally is closed by a gravity operated check valve 56. However, when evacuating air from compartment 15 valve 56 is opened, permitting air and liquid being drawn into the tank to be discharged through opening 55 directly into storage compartment 15, as well as through standpipe 18.

As the storage compartment begins to fill with liquid, it engages a float valve 57 comprising a block of closed cell polyethylene material hinged at one end to a depending baffle plate 58 between flanges 59 thereof by a hinge pin 60. Baffle plate 58 deflects liquid passing through opening 55 away from valve 57, to avoid any interference with proper operation of valve 57. When storage compartment 15 is full, valve 57 closes the lower end of passage 50 through mounting plate 11, thereby interrupting the suction line to storage compartment 15, even though the motor and pump continue operating.

The selection of a light weight cellular material such as that indicated has the further advantage that it floats, not only on liquids but also on foam, such as a detergent foam where that is being picked up. In this way, the air passage 50 is shut off before any foam, liquid or the like can be drawn into motor compartment 16.

A screen 61 and cellular plastic filter 62 are positioned in passage 50 to prevent entrained moisture and debris from passing through passage 50 to the air turbine.

In the other, discharge position of valve 42, shown in FIG. 11, valve passage 52 places the air turbine exhaust passage 43 in communication with passage 50 leading to the tank storage compartment 15. The other valve passageway 53 places the turbine air inlet in communication with the ambient atmosphere through passages 40, 53 and 45 and slots 47 and 48. As a result, the turbine now draws air from outside the tank and delivers it under pressure into storage compartment 15 pushing float valve 57 out of the way and pressurizing the storage compartment. Such pressurizing of storage compartment 15 closes check valve 56 at the top of the standpipe, and forcibily ejects the liquid stored in the tank out through standpipe 18, conduit 19, flexible hose 20, wand 23 and nozzle 24, as illustrated in FIG. 2. Because the tank contents are being discharged under pressure, they can be discharged at a substantial elevation, for example 8 feet, which would not be possible with a simple gravity drain unless a siphoning action first were produced.

For convenience in manipulating valve 42, a return spring 61 of the torsion type is positioned about the mounting bolt 33. At its upper end, spring 61 is secured to baffle plate 39, as shown in FIG. 8. The opposite end 63 of spring 61 is hooked over a strap 62 secured at its end in notches in the upper side of valve 42. A lanyard 64 is secured at one end to valve 42, and extends along a peripheral groove 65 around the upper end thereof, passing outwardly through a grommet 73 in motor cowling 3, and terminating in a knob 66 for grasping by the user.

Spring 61 urges valve 42 into the intake position shown in FIG. 10. When it is desired to eject liquid from the storage compartment 15 the operator pulls lanyard 64, rotating valve 42 out of the intake position of FIG. 10 and into the discharge position of FIG. 11. As soon as the tank contents have been discharged, the operator simply releases the lanyard, and spring 61 returns valve 42 to its intake positon.

A shield 67 carried by baffle plate 39 extends downwardly along and around the upper end of valve 42, to confine lanyard 64 in groove 65. Valve 42 can be a graphite impregnated phenolic resin, for self-lubrication.

To reinforce the tank body 2 between its front and rear walls, without producing additional openings therethrough, a tubular strut 68 carried by a generally U-shaped strap 69 extending therethrough is fitted snugly between the walls. At its upper end, strap 69 is formed to engage between flange 12 and back plate 14 and around the latter, as clearly shown in FIG. 8.

In addition to reinforcing the tank body, strut 68 provides a stop for float 57 in its lowered position. Strut 68 holds float 57 in an inclined position, facing upwardly toward the mouth 70 of air passage 50, whereby float 57 is always in position to float up toward the air passage, instead of swinging in the opposite direction.

The power line 71 to the pump motor and a control switch line 72 therefor extend hrough cowling 3. Cord 71 can be connected to any suitable power source, not shown, while cord 72 carries a control switch, not shown, which can hang over the shoulder and chest of the user for attachment to harness 8. The internal circuitry will be obvious to those skilled in the art, and is omitted for clarity as to other details of construction as well as ease of illustration.

Thus, it is seen that this invention fully accomplishes its intended objects. In addition to picking up, storing and subsequenly discharging liquid accumulations, the power discharge can first be used to discharge a cleaning fluid or solvent from the tank onto the material to be picked up. While only one embodiment has been disclosed in detail, that has been done by way of illustration, without thought of limitation.

Having completely disclosed and described this invention, and its mode of operation, what is claimed as new is:

1. A portable liquid pick-up, storage and discharge device adapted to be carried about on the back of a user and comprising a tank, means including a barrier separating said tank into a liquid storage compartment and a superposed motor compartment, means including a harness for mounting said tank on the back of a person, an elongated tubular conduit connected to said tank and extending therefrom for delivering liquid to and from said storage compartment, said conduit including a flexible hose portion externally of said tank and an internal conduit portion extending downwardly into said liquid storage compartment from adjacent the upper end thereof, said internal conduit portion terminating at its lower end in closely spaced relation to the bottom of said tank, an air pump and a drive motor therefor mounted in said motor compartment, said pump having an inlet and an outlet, air passages contained within said tank placing said pump in communication with said storage compartment, and a passage control valve carried by said barrier within said motor compartment and movable between a first position connecting said pump inlet to said storage compartment for evacuating air therefrom to draw liquid into said storage compartment through said conduit and a second position connecting said pump outlet to said storage compartment for pressurizing said storage compartment to discharge liquid therefrom through said internal conduit portion, air intake and exhaust openings in said tank communicating with said motor compartment, spring means biasing said valve into one of said positions, and means connected to said valve including a lanyard extending from said tank for selectively moving said valve to the other of said positions against the urging of said spring means, said air pump, said motor and said control valve being contained within said tank.

2. A portable liquid pick-up, storage and discharge device as set forth in claim 1, wherein said conduit externally of said tank comprises a flexible hose connected at one end to said tank, and a relatively rigid wand of electrically non-conductive material connected at one end to the other end of said hose.

3. A liquid pick-up, storage and discharge device as set forth in claim 1, said spring means yieldably urging said valve into said first position.

4. A liquid pick-up, storage and discharge device as set forth in claim 1, wherein said air passages include an air passage opening through said barrier into said storage compartment, and a float valve mounted in said storage compartment for closing said last-named air passage to stop the evacuation of air from said storage compartment when the latter is filled to a predetermined level with liquid, wherein said float valve comprises a block of cellular plastic hinged adjacent one end for swinging into air passage closing position.

5. A liquid pick-up, storage and discharge device as set forth in claim 4, together with stop means holding said valve block in an inclined open position facing toward said last-named air passage.

6. In a portable liquid pick-up, storage and discharge device adapted to be carried about on the back of the user, a tank comprising a body having a bottom wall, an open upper end surmounted by a motor cowling, means including a harness for mounting said tank on the back of a person, means including a mounting plate extending across the open upper end of said tank body and providing a liquid storage compartment in said body and an enclosed motor and pump compartment in said cowling separate from said liquid storage compartment, an elongated tubular conduit connected to said tank for delivering liquid to and from said storage compartment, said conduit including a portion extending downwardly into said storage compartment from adjacent said upper end of said body and terminating at the lower end thereof in closely spaced relation to said bottom wall of said tank body, said conduit also including a flexible hose portion externally of said tank, an air pump and a drive motor therefor in said motor and pump compartment, said pump being mounted on said plate, motor ventilating air intake and exhaust openings in said cowling, another air intake and exhaust opening in said cowling separate from said motor ventilating air openings therein, said pump having an air inlet and an air outlet, means for connecting said pump inlet to said liquid storage compartment to evacuate the same and thereby draw liquid into said storage compartment through said conduit and for alternately disconnecting said inlet from said storage compartment and connecting said pump outlet to said storage compartment to pressurize the same and thereby discharge liquid from said storage compartment through said conduit portion, said last-named means including a reversing valve mounted in said tank for movement on said plate and air passages through said plate and said valve, placing said storage compartment in communication with said pump, and means including a baffle subdividing said motor and pump compartment and defining a motor ventilating path through said cowling between said motor ventilating openings separate and distinct from a pump air inlet and outlet path through said cowling and said other opening, said pump, said motor, said valve and said air passages being contained within said tank.

7. A portable liquid pick-up, storage and discharge device as set forth in claim 6, said tank having a bottom wall provided with a clean-out opening therethrough, and a removable closure for said opening.

References Cited

UNITED STATES PATENTS

| | | |
|---|---|---|
| 2,210,950 | 8/1940 | Replogle. |
| 2,533,395 | 12/1950 | Paine _____ 210—416 X |
| 2,623,234 | 12/1952 | Brown _____ 15—330 |
| 2,643,732 | 6/1953 | Keen _____ 15—321 X |
| 3,029,463 | 4/1962 | Bishop _____ 15—353 |
| 3,165,774 | 1/1965 | Barba _____ 15—321 X |

FOREIGN PATENTS

| | | |
|---|---|---|
| 763,304 | 2/1934 | France. |
| 417,817 | 1/1947 | Italy. |
| 150,274 | 1/1932 | Switzerland. |

ROBERT W. MICHELL, *Primary Examiner.*